United States Patent [19]

Kunze et al.

[11] Patent Number: 4,786,934
[45] Date of Patent: Nov. 22, 1988

[54] PHOTOGRAPHIC CAMERA HAVING AN INTERCHANGEABLE LENS

[75] Inventors: Heinz Kunze, Huettenberg-Rechtenbach; Dirk Tautenhahn, Solms-Albshausen, both of Fed. Rep. of Germany

[73] Assignee: Ernst Leitz Wetzlar GmbH, Wetzlar, Fed. Rep. of Germany

[21] Appl. No.: 114,758

[22] Filed: Oct. 30, 1987

[30] Foreign Application Priority Data

Nov. 5, 1986 [DE] Fed. Rep. of Germany ....... 3637742

[51] Int. Cl.[4] .......................... G03B 3/08; G03B 3/10; G03B 7/097
[52] U.S. Cl. .................... 354/409; 354/400; 354/289.1; 354/441
[58] Field of Search ............... 354/400, 402, 403, 409, 354/195.1, 195.12, 195.13, 199, 200, 201, 441, 442, 443

[56] References Cited

U.S. PATENT DOCUMENTS

| | | | |
|---|---|---|---|
| 4,299,457 | 11/1981 | Ducommon | 354/195.13 X |
| 4,470,681 | 9/1984 | Johnson | 354/403 |
| 4,557,577 | 12/1985 | Shinoda | 354/400 |
| 4,584,704 | 4/1986 | Ferren | 354/400 X |
| 4,639,110 | 1/1987 | Rinn et al. | 354/403 |
| 4,639,588 | 1/1987 | Shinoda | 354/403 X |

FOREIGN PATENT DOCUMENTS

| | | |
|---|---|---|
| 1954391 | 5/1978 | Fed. Rep. of Germany ....................... 354/195.13 |
| 2755368 | 6/1979 | Fed. Rep. of Germany . |
| 2902742 | 8/1979 | Fed. Rep. of Germany ...... 354/289 |
| 3035568 | 6/1981 | Fed. Rep. of Germany . |
| 2514230 | 11/1981 | Fed. Rep. of Germany . |
| 3214063 | 11/1982 | Fed. Rep. of Germany . |

*Primary Examiner*—W. B. Perkey
*Attorney, Agent, or Firm*—Foley & Lardner, Schwartz, Jeffery, Schwaab, Mack, Blumenthal & Evans

[57] ABSTRACT

A photographic camera having an interchangeable lens and an automatic exposure control and focusing device comprising a computing circuit for the determination of the front and rear depth-of-field planes. The computing circuit is connected to a data memory on the camera side, a control unit, an autofocus central unit and an exposure control device. At a given stored sharpness and open aperture, the front and rear depth-of-field planes are automatically controlled by means of a setting element and can be assessed in the viewfinder. A predetermined depth-of-field range can be set and the required aperture can be displayed in the viewfinder and set, if this aperture is present on the interchangeable lens. The controlled depth-of-field planes remain visible in the viewfinder for a predetermined period of time.

10 Claims, 2 Drawing Sheets

PHOTOGRAPHIC CAMERA HAVING AN INTERCHANGEABLE LENS

BACKGROUND OF THE INVENTION

The invention relates to a photographic camera having an interchangeable lens which, by means of an automatic focusing device with a sharpness memory, images on a ground-glass screen an object image which is observable in a view finder of the camera. The camera also has an exposure metering and automatic program exposure control device based on the open-aperture system, and an electronic computing circuit for the determination of the limits of the depth of field of the sharply imaged object by means of the data transmitted from a read-only memory (ROM) or a microprocessor (CPU) of the interchangeable lens to a central unit ($C^2PU$), to a focusing control unit and also to the exposure control device.

A photographic camera having automatic exposure and depth-of-field information in the viewfinder is disclosed in German Offenlegungsschrift No. 3,035,568. An electronic computing circuit having a computer which can be switch over to two computer programs for the front and rear limit of depth of field is employed in this camera. The inputs of the computer are connected to signal generators for the set distance, the preselected aperture and the focal length of the particular lens which is employed in each instance. Signal values characterizing the limits of the respective depth of field are present at the output of the computing circuit. These can be fed to the viewfinder, so that the exposure distance and the depth-of-field range are displayed thereon digitally or by means of an LED line, along with the exposure values. For this purpose, it is necessary, after the manual focusing on a definite object and the aperture preselection, to actuate a depth-of-field key. In this case, an exact assessment of the depth-of-field range by observation of the entire ground-glass screen image is not possible.

German Offenlegungsschrift No. 2,755,368 discloses a photographic camera having a device for association and display of the depth-of-field range and lens-focusing values. The device comprises an actual-value generator for the set distance, a memory for the front and rear depth-of-field plane, two computers connected to the memory for the determination of the theoretical aperture number and the theoretical focusing distance, and a comparator for the output signals of the actual-value generator and the second computer. A first display device connected to the output of the comparator responds in the event of coincidence and/or deviation of the output signals of the actual-value generator and the second computer while a second display device, connected to the output of the first computer, is provided for the theoretical aperture number.

After manual focusing on the front and rear depth-of-field plane, respectively, and storage of the respective values, the display device emits a stop signal on actuation of the distance-setting device, when the exact distance is set. This camera does not provide a ground-glass screen display of the limits of the depth of field in the case of automatic focusing.

Finally, photographic cameras having automatic focusing and automatic exposure control according to the method of open-aperture metering (TTL metering) are known, and these cameras have a stop-down key. The stop-down key closes the lens to the working or operational aperture, and can be used for the depth-of-field monitoring of the ground-glass screen image in the viewfinder. At relatively large aperture numbers corresponding to relatively small apertures, a darkening of the ground-glass screen image takes place, and this makes the assessment of the depth of field considerably more difficult.

SUMMARY OF THE INVENTION

One object of the invention is to provide a photographic camera which permits a problem-free assessment of the limits of the depths of field with a bright ground-glass screen and with the best sharpness stored.

Another object of the invention is to provide, for a desired depth of field, display and setting of the required aperture as a function of the specific data of the interchangeable lens employed, if the interchangeable lens has this aperture available.

In accomplishing the foregoing objects, there has been provided according to one aspect of the present invention a camera having an aperture, comprising a viewfinder having means to display depth-of-field data; a lens having means for storing lens data; an automatic focusing device for providing data on the depth-of-field range including data on the front and rear depth-of-field planes of an imaged object, the automatic focusing device being operatively connected to the lens so as to receive lens data and to the viewfinder so as to provide depth-of-field data to the viewfinder; an automatic program exposure control device operatively connected to the automatic focusing device; and means for successively automatically positioning the lens to the front and rear depth-of-field planes comprising a drive motor for displacing the lens, the means for successively automatically positioning the lens being operatively connected to the automatic focusing device so as to successively displace the lens to the front and rear depth-of-field planes provided by the automatic focusing device, whereby the means for displaying data on the depth-of-field in the viewfinder displays data on each respective depth-of-field plane at each successive position of the lens.

In another aspect of the invention, there has been provided a camera having an aperture, comprising a viewfinder having means to display depth-of-field data; a lens having means for storing lens data; an automatic focusing device for calculating a depth-of-field range or receiving data on a predetermined depth-of-field range of an imaged object, the automatic focusing device being operatively connected to the lens so as to receive lens data and to the viewfinder so as to provide depth-of-field data to the viewfinder; an automatic program exposure control device operatively connected to the automatic focusing device; means for successively automatically positioning the lens to the front and rear depth-of-field planes which define the depth-of-field range comprising a drive motor for displacing the lens, the means for successively automatically positioning the lens being operatively connected to the automatic focusing device so as to successively displace the lens to the front and rear depth-of-field planes, whereby the means for displaying data on the depth-of-field range in the viewfinder displays data on each respective depth-of-field plane at each successive position of the lens; means operable in the event that a predetermined depth-of-field range is provided to the automatic focusing device for displaying a minimum theoretical aperture number in the viewfinder for the predetermined depth-of-field range; and means operatively connected to the automatic program exposure control device for setting the aperture to the minimum theoretical aperture number.

In a preferred embodiment, the invention further comprises a setting element operatively connected to the computing circuit for controlling the limits of the depth-of-field and a release operatively connected to the setting element.

Further objects, features and advantages of the present invention will become apparent from the detailed description of preferred embodiments which follows, when considered together with the attached figures of drawing.

BRIEF DESCRIPTION OF THE DRAWINGS

Further details of the invention are explained in greater detail hereinbelow, with reference to an exemplary embodiment schematically shown in the drawings. In the drawings.

DETAILED DESCRIPTION OF THE PREFERRED EMBODIMENTS

The relationships $$a_V = \frac{f^2 \cdot (\beta + 1)}{f \cdot \beta + u \cdot k} \text{ and } a_H = \frac{f^2 \cdot (\beta + 1)}{f \cdot \beta - u \cdot k}$$

are known for calculating the front and rear limits of the depth-of-field range $a_V$ and $a_H$, where $f$=focal length, $k$=aperture number, $\beta$=magnification and $u$=out-of-focus diameter. Combining the two above formulas yields the depth-of-field range:

$$a_V - a_H = \frac{2u \cdot k(\beta + 1)}{\beta^2 - \frac{u^2 \cdot k^2}{f^2}}$$

The above relationships can be incorporated into a computer program, in which case, the equation $$\frac{2u \cdot k(\beta + 1)}{\beta^2}$$

which is independent of the focal length, is expediently used for the close-up and macro range, when appropriate interchangeable lenses are employed.

The permissible out-of-focus diameter is dependent upon the image format, and is indicated as 0.033 mm for the 35 mm formation practice, however, the value of 0.02 mm, which is fed into the central unit as a constant, is more appropriate. However, the value of the permissible out-of-focus diameter can also be specified as a function of the exposure conditions, for example, the set aperture (modulation transfer function, object contrast) and the type of film employed. The remaining values are stored in the lens ROM and are transmitted from the ROM to the central unit in each instance. A microprocessor in the lens can also be used, in place of the lens ROM.

Figure 1:
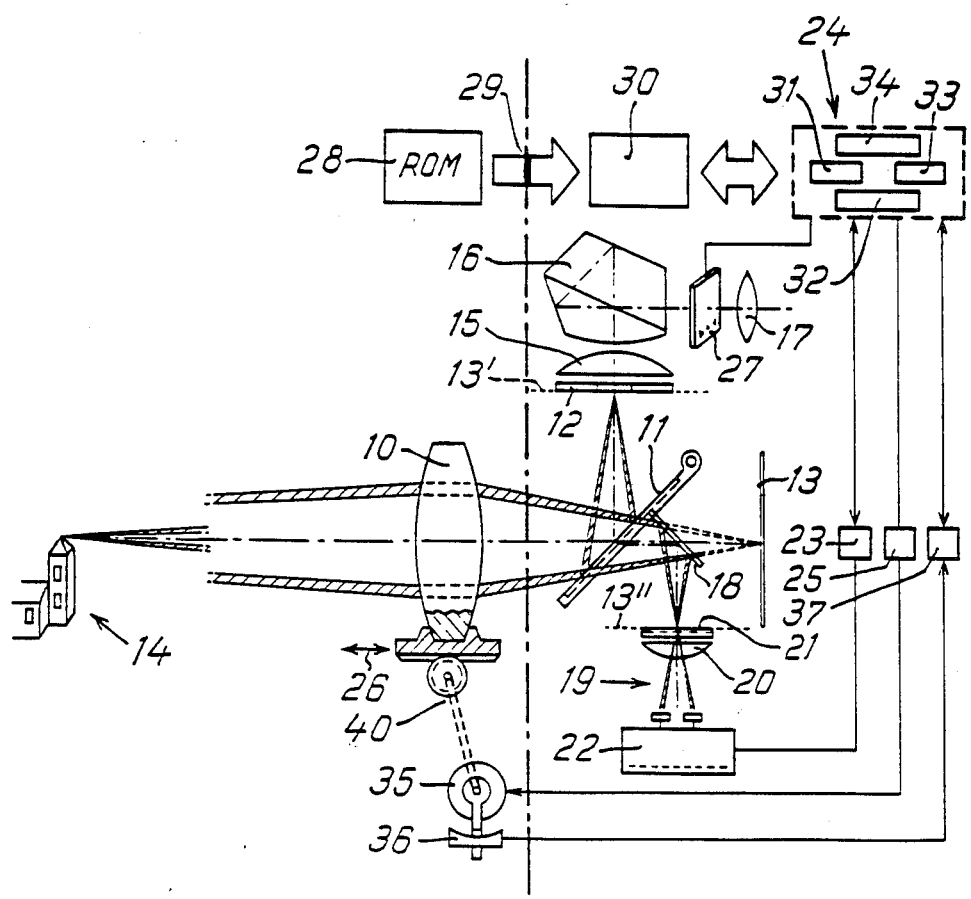
FIG. 1 is a longitudinal cross section of a camera of known construction, provided with a circuit arrangement according to the invention, for the automatic control of the limits of the depth of field, as well as for the setting of the minimum theoretical aperture number.

FIG. 1 shows schematically a reflex camera of known construction. The camera shown in FIG. 1 has an automatic focusing device based on the principle of phase-difference detection. The light emerging from an interchangeable lens 10 is partially transmitted and partially reflected by a partial-transmitting main mirror 11. The reflected component forms on a ground-glass screen 12, which is disposed in a plane 13' (which is positioned relative to the film plane 13), an image of an object 14, which can be observed in a viewfinder 17 via a field lens 15 and a deflecting prism 16. The light component penetrating the main mirror 11 is deflected downwardly by an auxiliary mirror 18, and forms a further plane (13''), which is positioned relative to the film plane and in which an autofocus sensor 19 is disposed. The autofocus sensor consists of a filter (not shown), a lens 20, an optical divider 21 and a semiconductor image converter 22 (CCD=Charge Coupled Device).

The electrical signals at the output of the semiconductor image converter 22 are fed to an autofocus interface IC (integrated circuit) 23, and via an autofocus central unit 24, to a motor IC 25 for controlling the movement of the lens 10 in the direction of the arrow 26. Also, the output of semiconductor image converter 22 is fed to a light balance 27, which is situated in the viewfinder 17 and which, in the balanced condition, indicates the focusing of the lens 10.

The lens data such as the focal length, the largest and smallest aperture, and the gear transmission ratio of the interchangeable lens 10 employed are stored in a read-only memory 28 (ROM) or a microprocessor CPU of the lens 10, and are inputted by means of electrical contacts 29 into a central unit ($C^2PU$) 30, which is on the camera side and which controls the autofocus central unit 24. The autofocus central unit 24 comprises microelectronic components, such as a data memory 31 (RAM), a computing unit 32 and a focusing control unit 33, as well as an $a_V$, $a_H$ computing circuit 34. The displacement of the interchangeable lens 10 takes place by means of a drive motor 35; in this connection, an encoder 36 generates pulses by which the autofocus central unit 24 controls the speed of rotation via an interface IC 37.

The semiconductor image converter 22 can be used both for the determination of the focusing and for exposure metering, as is described in German patent Specification No. 2,514,230 and German Offenlegungsschrift No. 3,214,063. However, it is also possible for a separate exposure-metering device (not shown) to be provided, which is acted upon, in a known manner, by measurement light from the auxiliary mirror. In this case, a further exposure-metering system can be disposed in a plane positioned relative to the film plane to control the flash exposure. These arrangements for exposure metering and exposure control are likewise known per se, and are in some cases utilized in cameras with automatic focusing which are already commercially available.

A preferred embodiment is described herein below, in its mode of operation, with reference to the block diagram of FIG. 2.

On securing the interchangeable lens 10 to the camera, the specific lens data contained in the read-only memory ROM 28 of the interchangeable lens 10 are transmitted via the central unit $C^2PU$ 30, which is on the camera side, into the autofocus central unit 24. The lens data essential for the exposure metering are transmitted from the central unit C²PU 30 to an exposure control circuit 38. Within the autofocus central unit 24, the lens data transmitted are stored in the data memory 31.

After actuation of a camera main switch (not shown), as well as selection and correction, if any, of the image area, the operator can activate the exposure and autofocus systems by touching a release 39, which is provided with a contact and a step switch (not shown). In this case, the autofocus sensor 19 delivers the best sharpness to be determined, corresponding to the object 14 sighted in the autofocus target field of the viewfinder ground-glass screen, in the form of analog signals. These analog signals are converted into digital signals by means of an A/D converter, and are passed via the autofocus interface 23 to the autofocus central unit. The autofocus central unit computes the deviation from the best sharpness and the direction of displacement of the interchangeable lens 10.

The digital data from the autofocus central unit 24 are received by the motor IC 25, and transmitted to the drive motor 35. The drive motor 35 is coupled to the interchangeable lens 10 by means of a gear 40. The encoder 36 converts the motor revolutions into a plurality of pulses, which are transmitted via the encoding interface 37 to the autofocus central unit 24, where a value for the distance is formed. The distance value is displayed in the viewfinder 17 in the described manner, and is stored in the data memory RAM 31 of the autofocus central unit 24 when the release 39 is partially pressed down.

(a) Display of the depth-of-field planes

Figure 2:
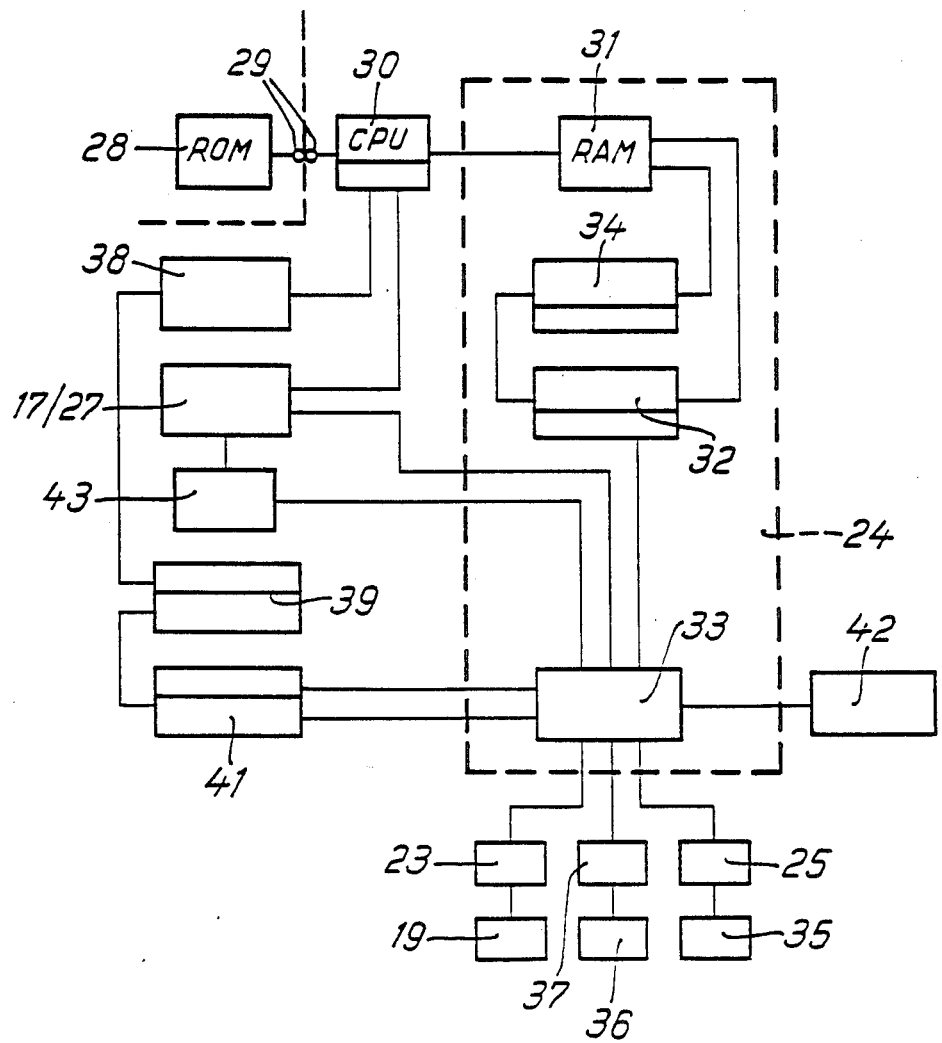
FIG. 2 is a block diagram of the control system according to the invention.

Referring now to FIG. 2, the $a_V/a_H$ computing circuit 34 is activated by displacement of a setting element 41 disposed in the vicinity of the release 39, when the release 39 is simultaneously situated in the partially pressed-down position—i.e., when the best sharpness is stored. Setting element 41 is also independently operable. The data required for the computation of the depth-of-field planes according to the previously described equations are read out from the data memory RAM 31, and the values for $a_V/a_H$ and their difference are computed in the computing circuit 34 and again stored in the data memory 31 of the autofocus central unit 24, and also transmitted to the viewfinder 17 and displayed there. The value for the front depth-of-field plane $a_V$ is transmitted via the autofocus computing unit 32 to the control unit 33, and is further passed from there via the motor IC 25 to the drive motor 35. With feedback from the encoder 36, the drive motor displaces the interchangeable lens 10 into the front depth-of-field plane $a_V$. A timing element 42 connected to the control unit 33 maintains this setting at open aperture and thus in the form of a bright ground-glass screen image for a period of time (approximately 2 to 5 seconds). In this way, a precise observation of the front depth-of-field plane is made possible. Subsequently, an automatic control of the rear depth-of-field plane $a_H$ takes place by means of the timing element 42 as well as the control unit 33, the motor IC 25 and the drive motor 35. After clearance of the setting element 41, the setting of the best sharpness, which is still stored and at which the camera can be operated by pressing down the release 39, is repeated.

If, for example, the focal length of the interchangeable lens employed is 100 mm, the set aperture number is 4 and the object distance set by means of the automatic focusing device is 2 m, then the result of $a_H=2.049$ m and $a_V-1.954$ m gives a value of 9.5 cm for the depth-of-field range $a_H$-$a_V$; and the lens is then successively automatically moved to the limits $a_H$ and $a_V$ of the depth-of-field range in the described manner. If the observation of the ground-glass screen image reveals that the depth of field is insufficient for the intended exposure, the range is enlarged by increasing the aperture number (for example, to 16 in this case at 38.5 cm).

(b) Predetermination of the depth-of-field range

If the desired depth-of-field range is known (e.g., close-up or portrait exposures; if so, range should be 25 cm according to a)), then, for example, setting element 41 can be actuated by displacing it in the opposite direction and the numerical value of $a_H$-$a_V$ for the smallest available aperture number (for example "4") or the set aperture number (in the case of program or aperture priority mode) will then be displayed in the viewfinder 17, along with the stored value of the best sharpness (2 m). By means of a forward/reverse counter 43, which is connected to the control unit 33 and to the display in the viewfinder 17, this value is increased or reduced in steps in the desired manner, depending upon the particular interchangeable lens 10 employed. In this case, the appropriate aperture number is at the same time input into the read-only memory ROM 28 thereof. If the aperture number required for the desired depth-of-field range is not available under given light conditions, a warning indication becomes visible in the viewfinder 17.

It is understood that numerous variations of the described exemplary embodiment are feasible. Thus, it is possible to apply other known devices or methods for automatic focusing. In place of the setting-element actuation coupled with the release, such actuation can also take place independently thereof, or the position of the setting element can be provided at a different place, for example, on a back wall of the camera. Finally, the electronic array can also be altered within the bounds of the circuit-engineering measures known per se.

What is claimed is:

1. A camera having an aperture, comprising;
   a viewfinder having means to display depth-of-field data;
   a lens having means for storing lens data;
   an automatic focusing device for providing data on the depth-of-field range including data on the front and rear depth-of-field planes of an imaged object, the automatic focusing device being operatively connected to the lens so as to receive lens data and to the viewfinder so as to provide depth-of-field data to the viewfinder;
   an automatic program exposure control device operatively connected to the automatic focusing device; and
   means for successively automatically positioning the lens to the front and rear depth-of-field planes comprising a drive motor for displacing the lens, the means for successively automatically positioning the lens being operatively connected to the automatic focusing device so as to successively displace the lens to the front and rear depth-of-field planes provided by the automatic focusing device, whereby the means for displaying data on the depth-of-field in the viewfinder displays data on each respective depth-of-field plane at each successive position of the lens.

2. A camera as claimed in claim 1, further comprising means for displaying a minimum theoretical aperture number in the viewfinder, the means for displaying a minimum theoretical aperture number being operatively connected to the automatic focusing device so as to display the minimum theoretical aperture number in the viewfinder when data on a predetermined depth-of-field range is provided to it by the automatic focusing device and means operatively connected to the automatic program exposure control device for setting the aperture to the minimum theoretical aperture number.

3. A camera as claimed in claim 1, wherein the automatic focusing device comprises an autofocus central unit having a data memory, a computing unit, a focusing control unit and a computing circuit for determining the limits of the depth-of-field of the imaged object operatively interconnected to one another.

4. A camera as claimed in claim 1, further comprising a screen operatively connected to the automatic focusing device so as to produce an object image which is observable through the viewfinder.

5. A camera as claimed in claim 1, further comprising a setting element operatively connected to the automatic focusing device and a release operatively connected to the automatic focusing device and the automatic program exposure control device, the setting element and the release being actuable to cause the automatic focusing device to provide data on the depth-of-field range and the setting element being independently operable to cause the means for successively automatically positioning the lens to operate.

6. A camera as claimed in claim 1, further comprising means for providing a warning indication in the viewfinder if the minimum theoretical aperture of the lens has been exceeded.

7. A camera as claimed in claim 2, further comprising means for automatically controlling the shutter speed operatively connected to the automatic program exposure control device, whereby the lens can be set to the minimum theoretical aperture number and the camera can be operated when the shutter speed and the aperture setting are automatically controlled.

8. A camera as claimed in claim 1, further comprising a timing element operatively connected to the automatic focusing device, the timing element for sequentially controlling the display of depth-of-field data in the viewfinder.

9. A camera as claimed in claim 2, further comprising a forward/reverse counter operatively connected to the viewfinder and the automatic focusing device, the forward/reverse counter for inputting values for the aperture number.

10. A camera having an aperture, comprising:
a viewfinder having means to display depth-of-field data;
a lens having means for storing lens data;
an automatic focusing device for calculating a depth-of-field range or receiving data on a predetermined depth-of-field range of an imaged object, the automatic focusing device being operatively connected to the lens so as to receive lens data and to the viewfinder so as to provide depth-of-field data to the viewfinder;
an automatic program exposure control device operatively connected to the automatic focusing device;
means for successively automatically positioning the lens to the front and rear depth-of-field planes which define the depth-of-field range comprising a drive motor for displacing the lens, the means for successively automatically positioning the lens being operatively connected to the automatic focusing device so as to successively displace the lens to the front and rear depth-of-field planes, whereby the means for displaying data on the depth-of-field range in the viewfinder displays data on each respective depth-of-field plane at each successive position of the lens;
means operable in the event that a predetermined depth-of-field range is provided to the automatic focusing device for displaying a minimum theoretical aperture number in the viewfinder for the predetermined depth-of-field range; and
means operatively connected to the automatic program exposure control device for setting the aperture to the minimum theoretical aperture number.

* * * * *